April 17, 1951     C. E. WHITE     2,549,734
DRAWBAR PICKUP
Filed July 8, 1947     2 Sheets-Sheet 2
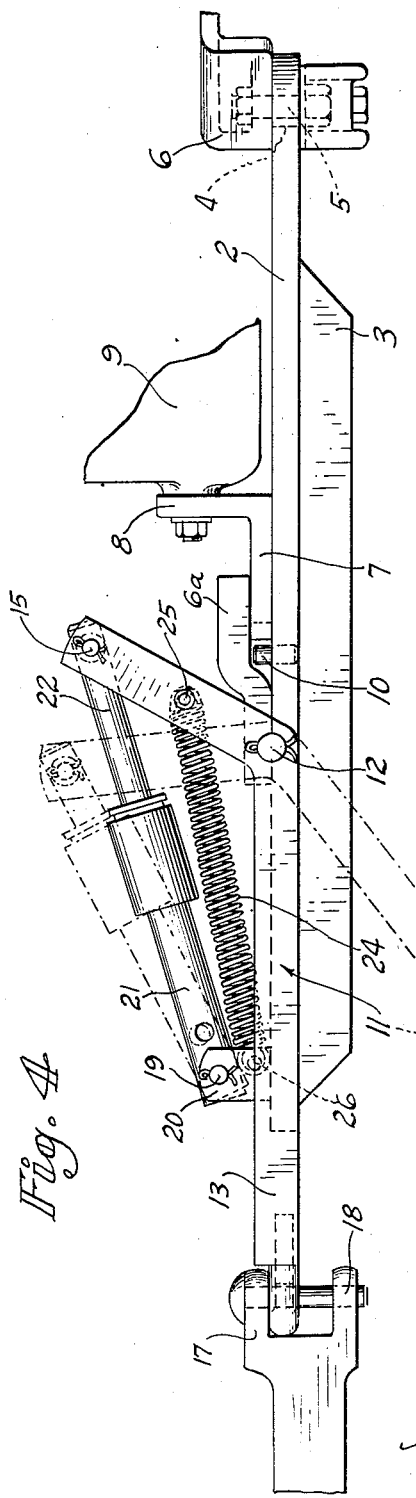
Fig. 4
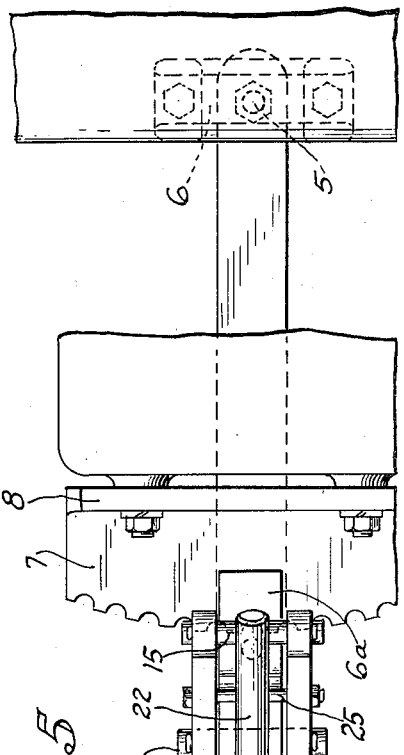
Fig. 5
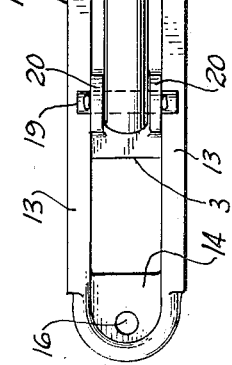
INVENTOR.
Carl E. White
BY Thiess, Olson & Mecklenburger
Attorneys Patented Apr. 17, 1951

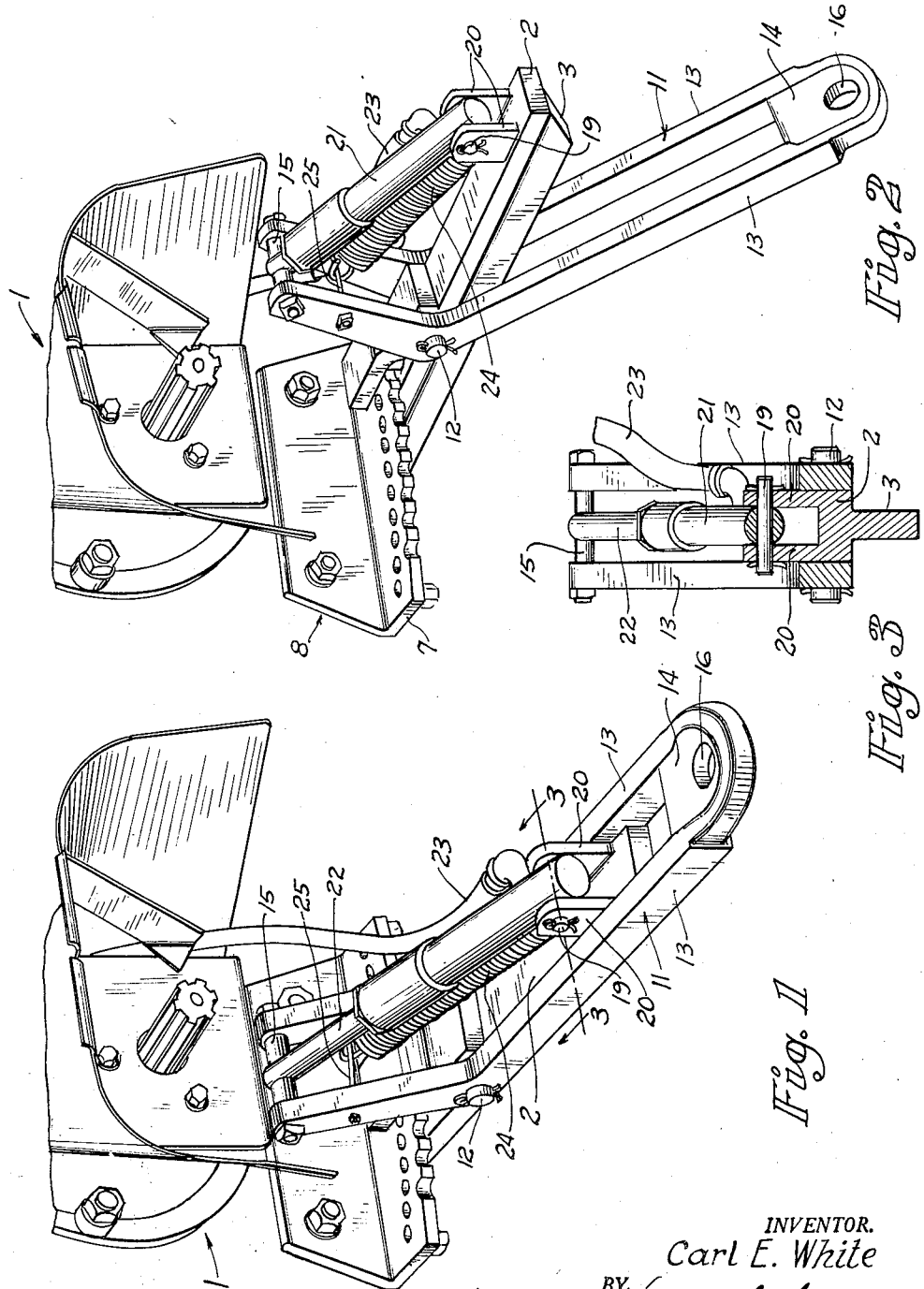

2,549,734

UNITED STATES PATENT OFFICE 2,549,734

DRAWBAR PICKUP

Carl E. White, Rockford, Ill., assignor to J. I. Case Company, Racine, Wis., a corporation of Wisconsin Application July 8, 1947, Serial No. 759,583

4 Claims. (Cl. 280—33.44)

1

The present invention relates to a drawbar and has special reference to an adjustable drawbar for being mounted on the rear end of a tractor. More particularly this invention relates to a drawbar having an adjustable hitch portion, the outer end of which may be positioned adjacent the ground, a distance above the ground in normal operating position, or in any desired intermediate positions.

Ordinarily, drawbars are mounted on the rear of tractors and extend substantially horizontally therefrom at the proper height for pulling the usual farm implement. Although drawbars are frequently movable horizontally they are capable of little vertical movement so that they remain at a substantially constant height above the ground. Consequently, to connect the drawbar of an implement to the tractor drawbar, the implement drawbar first must be raised to hitching position. With many implements this requires considerable force and may be dangerous to the operator.

With the present invention the free end or hitch portion of the tractor drawbar may be lowered to a position adjacent the ground and placed to engage the usual clevis at the end of the implement drawbar. Thereafter, by means operated from the tractor, the tractor drawbar, together with the drawbar on the implement, may be raised to operative position. No manual handling of the drawbars is necessary other than to place a bolt or pin through the clevis on the implement drawbar and the eye in the tractor drawbar.

There is the further advantage in the present construction that the tractor drawbar may be vertically adjusted even when it is pulling an implement.

An object of this invention is to provide a tractor drawbar having its outer end vertically adjustable to a plurality of positions above the ground and also adjacent the ground.

Another object is to provide a tractor drawbar which may be associated with an implement drawbar at ground level and then raised by suitable means to operating position together with the implement drawbar.

Still another object is to provide such a tractor drawbar which may be raised and lowered by suitable means controlled from the tractor operator's station or seat.

A further object is to provide a drawbar which may be adjusted to desired height even when there is a load thereon.

Further objects and advantages will be apparent from the following description and claims

2 when considered with the accompanying drawings, in which:

Figure 1 is a perspective view of a drawbar embodying the present invention attached to the rear end of a tractor;

Fig. 2 is a perspective view similar to Fig. 1, with the outer end of the hitch portion of the drawbar in lowered position;

Fig. 3 is a vertical cross-sectional view taken along the lines 3—3 of Fig. 1 showing a portion of the hydraulic system for positioning the hitch portion of the drawbar;

Fig. 4 is a side elevational view of the drawbar with the fluid supply line omitted; and Fig. 5 is a top plan view thereof.

Referring more particularly to the drawings, there is shown a drawbar embodying the present invention mounted on the rear end of a tractor 1. The drawbar comprises a longitudinal support or frame 2 having a reinforcing rib 3 on the lower side thereof. The inner end of the frame is pivotally connected to the tractor. For this purpose an opening 4 is formed in the inner end of the frame for receiving a bolt 5 supported by a bracket 6 fixedly mounted on the tractor. The opening 4 in the frame extends longitudinally a distance to permit play between the frame 2 and the bolt 5. Secured to the top of the frame 2, such as by welding, is a plate portion 6a having its inner end spaced from the top of the frame 2 to permit the insertion therebetween of the horizontally extending flange 7 of the bracket 8. This bracket, which may be secured to the housing 9 of the tractor, therefore serves substantially to prevent vertical movement of the frame 2 while permitting horizontal movement thereof about the pivot 5.

The rear edge of the horizontal portion 7 of the bracket 8 is provided with a series of notches, and adjacent thereto a pin 10 extends upwardly from the frame 2. The pin 10 is so positioned that when the tractor is moving forwardly the pin 10 will not contact the flange 7. However, if the tractor is backed, the pin 10 will engage one of the notches in the flange 7 due to the play between the bolt 5 and the frame 2 and will, therefore, prevent jackknifing of the drawbar.

A bell crank hitch portion 11 is pivotally mounted on the frame 2 by a pivot pin 12. This hitch portion may comprise a pair of parallel bell crank side members 13 spaced apart a sufficient distance to receive the frame 2 therebetween. The outer or rear ends of the side members 13 extend beyond the free end of the frame 2 and are joined together by a web portion 14. With this arrangement the web portion may be placed between the opposite sides of a clevis 17 on an implement drawbar and a pin 18 passed therethrough to connect the implement to the tractor.

Suitable mechanism extending between the frame and the hitch portion is provided for pivoting of the hitch portion about its pivot 12. Pivoting of the hitch portion acts to move the outer end thereof between its raised position substantially parallel to the frame 2, shown in Fig. 1 and the full line position of Fig. 4, and its lower position adjacent the ground as illustrated in Fig. 2 and the dotted line position of Fig. 4.

Hydraulic mechanism is preferably employed in the present embodiment for moving the hitch portion, although any other suitable means may be employed if desired. A pressure cylinder 21 having a piston therein (not shown) is pivotally connected at one end to a pin 19 supported by the brackets 20 on the frame 2. A rod 22 attached to the piston extends from the opposite end of the cylinder and is pivotally connected to the shaft 15. Fluid under pressure is supplied to the cylinder through a line 23 which connects with the cylinder adjacent the pivotally mounted end thereof.

When fluid under pressure is forced into one end of the cylinder, the piston rod is forced from the other end of the cylinder, thereby moving the inner end of the hitch 11 forwardly and raising the outer end thereof to its upper position adjacent the frame 2.

A coil spring 24 extends between a rod 25 secured to the inner ends of the hitch 11 and a pin 26 secured to the side brackets 20 on the frame 2. As the spring 24 is under tension it tends to maintain the hitch with its outer end in lowered position adjacent the ground.

Any suitable means may be employed for controlling the supply of fluid to the cylinder 21. This may consist of a valve in the supply line 23 controlled from the tractor operator's station. The valve is preferably of a type that may be adjusted to connect the line 23 with a source of supply of the fluid under pressure, or to prevent escape of fluid from the cylinder, or to connect the line with a sump or tank to permit escape of the fluid from the cylinder. Such valves are well known in the art.

In use, the tractor with the hitch portion thereon in lower position is maneuvered to bring the outer end of the hitch portion into association with the clevis or other hitching means on the drawbar of an implement, as is illustrated by the dotted line portion of Fig. 4. The valve is then set to cause fluid under pressure to be supplied to the cylinder. This pivots the hitch portion and raises the outer end thereof together with the implement drawbar up to operating height. When the desired height is reached the valve is actuated to merely prevent escape of the fluid then in the cylinder. Insertion of the hitching pin 18 thereafter prevents separation of the implement from the tractor. To lower the outer end of the hitch portion and disconnect the implement from the tractor the pin 18 is removed and the control valve set to permit escape of the fluid from the cylinder 21. The spring 24 alone, or in conjunction with the downward thrust of the implement drawbar, will then cause the hitch portion to pivot about its pivot 12 and the outer end to return to lower position adjacent the ground.

While I have shown and described a particular embodiment of the present invention it is to be understood that various changes and modifications may be made therein without departing from the present invention and, therefore, I wish to be limited only by the prior art and the appended claims.

I claim:

1. A drawbar construction comprising a relatively narrow elongated frame for being substantially centrally secured to one end of a tractor and extending outwardly therefrom, a bellcrank hitch portion pivotally connected about a substantially horizontal axis to said frame at a distance from the outer end thereof somewhat less than the length of the outer leg of said bellcrank so that said leg extends outwardly beyond said frame for connection to the drawbar of a drawn vehicle, the outer end portion of said leg being movable about said pivot to positions adjacent to and a distance above the ground, a fluid pressure cylinder having a piston therein and a rod connected to said piston and projecting from an end of said cylinder, the opposite ends of said cylinder and said rod being pivotally connected to said bellcrank adjacent the inner end thereof and to said frame adjacent the outer end thereof, and means operable from said tractor for controlling the extension and contraction of said rod and cylinder to thereby raise and lower the outer end of said bellcrank.

2. A drawbar construction comprising a frame for being secured to a tractor and extending outwardly therefrom, a bellcrank hitch portion pivotally connected about a substantially horizontal axis to said frame at a distance from the outer end thereof somewhat less than the length of the outer leg of said bellcrank so that said leg extends outwardly beyond said frame for connection to the drawbar of a drawn vehicle, the outer end portion of said leg being movable about said pivot to positions adjacent to and a distance above the ground, a fluid pressure cylinder having a piston therein and a rod connected to said piston and projecting from an end of said cylinder, the opposite ends of said cylinder and said rod being pivotally connected to said bellcrank adjacent the inner end thereof and to said frame adjacent the outer end thereof, means operable from said tractor for controlling the extension and contraction of said rod and cylinder to thereby raise and lower the outer end of said bellcrank, and resilient means for urging the inner end of said bellcrank toward the outer end of said frame to normally maintain the outer end of said bellcrank in lower position.

3. A drawbar construction comprising a frame for being secured to a tractor and extending outwardly therefrom, the inner end of said frame being pivotally connected to said tractor about a substantially vertical axis to permit pivoting of said frame in a substantially horizontal plane, means for maintaining said frame in a horizontal plane, a bellcrank hitch portion pivotally connected about a substantially horizontal axis to said frame at a distance from the outer end thereof somewhat less than the length of the outer leg of said bellcrank so that said leg extends outwardly beyond said frame for connection to the drawbar of a drawn vehicle, the outer end portion of said leg being movable to positions adjacent to and a distance above the ground, a fluid pressure cylinder having a piston therein and a rod connected to said piston and projecting from an end of said cylinder, the opposite ends of said cylinder and said rod being pivotally connected to said bellcrank adjacent the inner end thereof and to said frame adjacent the outer end thereof, and means operable from said tractor for controlling the extension and contraction of said rod and cylinder to thereby raise and lower the outer end of said bellcrank.

4. A drawbar construction comprising an elongated frame for being secured to a tractor and extending outwardly therefrom, a hitch portion comprising a pair of bellcrank side members spaced apart a distance sufficient to fit over said frame, said hitch portion being pivotally connected about a substantially horizontal axis to said frame at a distance from the outer end thereof somewhat less than the length of the outer leg of said bellcrank so that said leg extends outwardly beyond said frame for connection to the drawbar of a drawn vehicle, the outer end portions of said leg being connected and movable about said pivot to positions adjacent to and a distance above the ground, a fluid pressure cylinder having a piston therein and a rod connected to said piston and projecting from an end of said cylinder, the opposite ends of said cylinder and said rod being pivotally connected to said bellcrank adjacent the inner end thereof and to said frame adjacent the outer end thereof, and means operable from said tractor for controlling the extension and contraction of said rod and cylinder to thereby raise and lower the outer end of said bellcrank.

CARL E. WHITE.

REFERENCES CITED

The following references are of record in the file of this patent:

UNITED STATES PATENTS

| Number | Name | Date |
| --- | --- | --- |
| 2,210,907 | Erickson | Aug. 13, 1940 |
| 2,320,168 | Benjamin et al. | May 25, 1943 |
| 2,374,970 | Williams | May 15, 1945 |